C. W. SHERMAN.
RUBBING DEVICE FOR ANIMALS.
APPLICATION FILED AUG. 24, 1911.
1,298,804.
Patented Apr. 1, 1919.
2 SHEETS—SHEET 2.
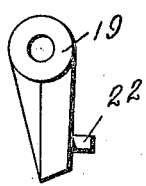
Fig. 6.
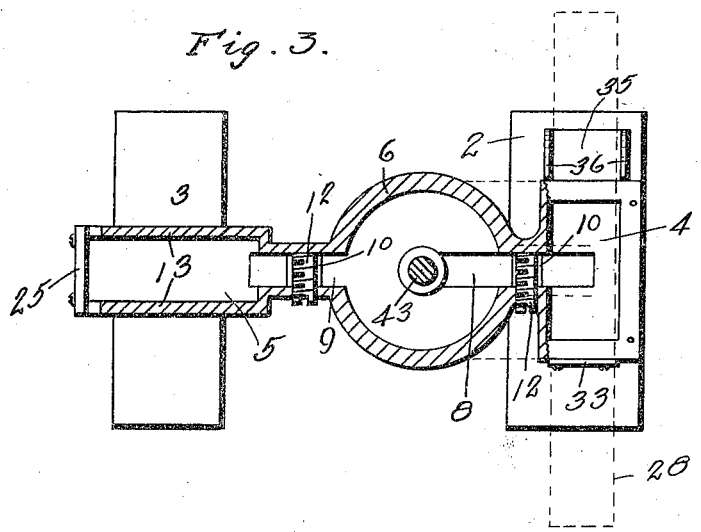
Fig. 3.
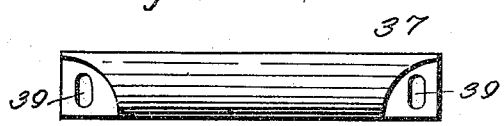
Fig. 7.
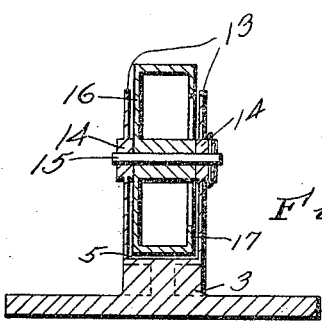
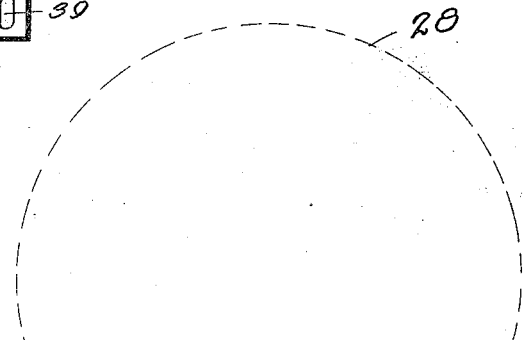
Fig. 4.
Fig. 5.
WITNESSES.
Jw naylor
E. M. Barnhardt
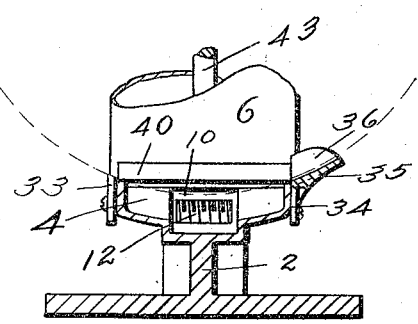
INVENTOR.
By Charles W. Sherman
La Ponte & Bean
Attys

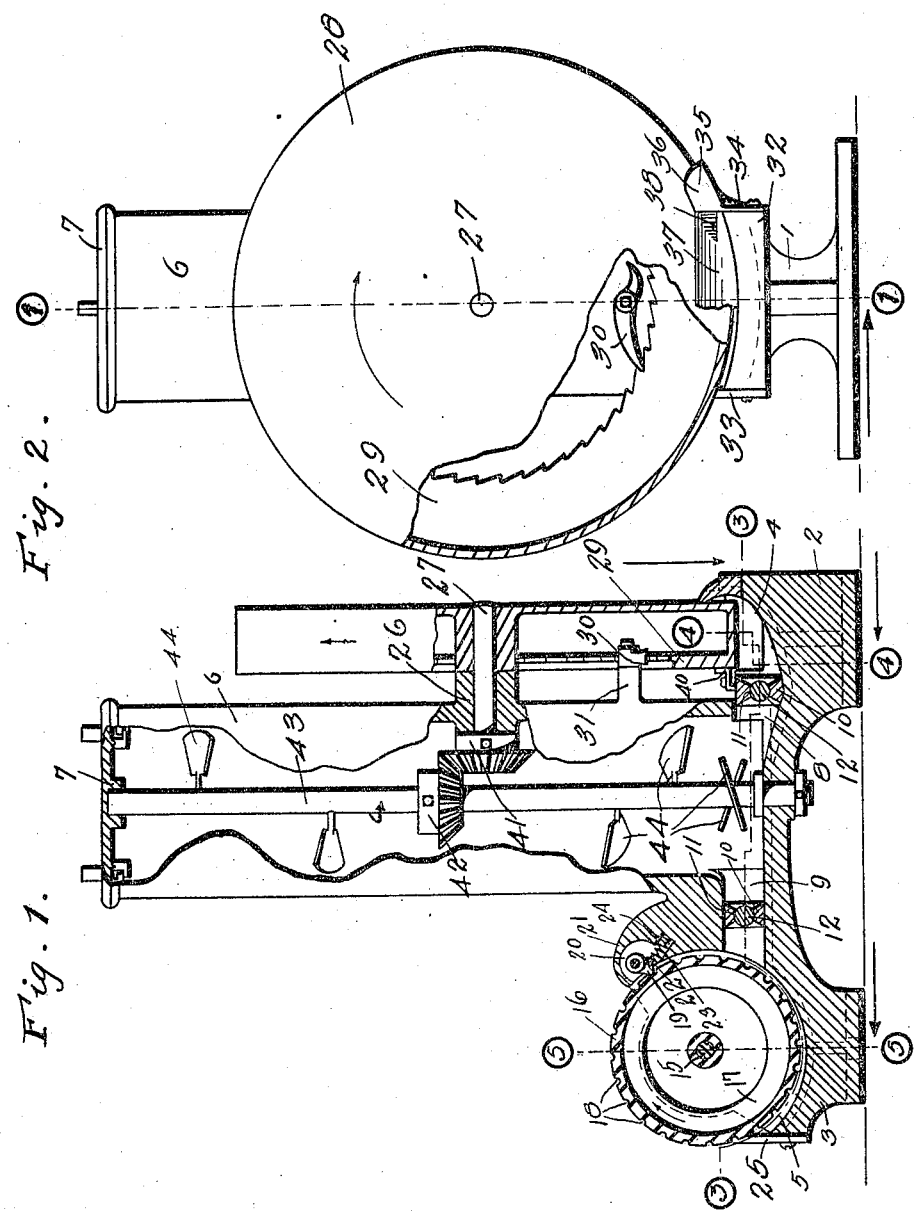

UNITED STATES PATENT OFFICE.

CHARLES W. SHERMAN, OF PEORIA, ILLINOIS, ASSIGNOR, BY MESNE ASSIGNMENTS, TO R. C. LOWES, OF PEORIA, ILLINOIS, DOING BUSINESS AS LOWES MANUFACTURING CO., OF PEORIA, ILLINOIS.

RUBBING DEVICE FOR ANIMALS.

1,298,804.     Specification of Letters Patent.     Patented Apr. 1, 1919.

Application filed August 24, 1911. Serial No. 645,768.

*To all whom it may concern:*

Be it known that I, CHARLES W. SHERMAN, a citizen of the United States, residing at Peoria, in the county of Peoria and State of Illinois, have invented certain new and useful Improvements in Rubbing Devices for Animals, of which the following is a specification.

My invention relates to improvements in rubbing devices for animals, whereby the animals themselves may distribute upon their bodies a suitable insecticide or disinfectant.

An object of my invention is the provision of an improved device of this type, whereby, the animals by rubbing action of their bodies distribute thereon the insecticide or disinfectant to relieve the skin of irritation and to heal sores, etc.

A further object of my invention is the provision of a rubbing device having a plurality of rubbing members or wheels each arranged on a horizontal axis and one member or wheel arranged to rotate in a plane at right angles to the plane of rotation of the other of said members or wheels, one of said members or wheels driving a force feed by means of gearing.

A further object of the invention is the provision of a device of the character described, wherein a receptacle is provided to contain a suitable disinfecting or medicated grease, having two outlets from said receptacle. Having connection with one of the outlets is a vertically disposed revoluble member or wheel which is designed to be rotated by the frictional contact and rubbing action of the bodies of the animals and thus apply and distribute the grease on said bodies, this wheel having means to prevent its rotation in one direction, and also wipers to remove surplus grease. A smaller revoluble member or wheel is provided in operative connection with the other outlet, having means for preventing its rotation in one direction; both outlets have adjustable valves or gates to control the passage of the grease therethrough, the grease being forced through said passages or outlets by means of a force feed in said receptacle, operated by the turning of the large wheel.

To the accomplishment of the foregoing, and such other objects as may hereinafter appear, my invention consists in the construction, combination and arrangement of parts and details hereinafter described and then sought to be defined in the appended claims, reference being had to the accompanying drawings forming a part hereof and illustrating merely a preferred embodiment of my invention, it being understood that various changes in the construction and details of the device may be made within the scope of the claims without digressing from my inventive idea, which is defined therein.

In the drawings, in which like characters of reference indicate the same parts in the several views, Figure 1 is an irregular, vertical section through the device taken mostly on the plane indicated by the line 1—1 of Fig. 2.

Fig. 2 is a front elevation of the device, parts being broken away.

Fig. 3 is a sectional view taken substantially on line 3—3 of Fig. 1 with the wheel removed.

Fig. 4 is a section taken substantially on line 4—4 of Fig. 1.

Fig. 5 is a section taken on line 5—5 of Fig. 1.

Fig. 6 is a detail.

Fig. 7 is a plan view of the plate or cap 37.

In the drawings, the stand, support, or base is indicated by the reference character 1. This base rests on the two short feet 2 and 3. In the base above the front foot 2, is formed the depression 4 and above the rear foot 3 is formed the depression 5. Formed on the base, between the front and rear feet 2 and 3, is the vertically extending, cylindrical portion 6. This cylinder constitutes a receptacle for receiving and containing the disinfecting or medicated material or grease used in the machine and is provided with a detachable cover 7 for the purpose of ready access thereto. The bottom of this cylindrical receptacle is connected with the front depression 4 by means of the outlet or passage 8 and with the rear depression 5 by means of the outlet or passage 9. Mounted in each of these passages are the blocks 10 which have screw threaded openings 11 therethrough, which openings provide restricted passages from the cylindrical receptacle 6 to the front and rear depressions in the supporting base. Mounted in these screw openings 11 are the screw threaded members 12 which constitute valve means for regulating and adjusting the size and lateral extent of the restricted openings 11.

Extending from the base or supporting member on opposite sides of the rear depression 5 are the plates or wheel supporting members 13 which are provided with bearings 14 for the shaft 15 of the small grease applying revoluble member or wheel 16. As shown, this wheel is hollow with a portion of one side cut away, leaving the flange 17 which is overlapped by one of the side plates or members 13. On the periphery of this wheel and centrally thereof is formed a series of corrugations or ratchet teeth 18. These corrugations or ratchet teeth are engaged by a dog or ratchet 19 which is pivoted in a recess 20 formed in an extension 21 of the base 1, which overhangs the small wheel 16. The dog or ratchet is provided with a laterally extending pin 22 about which one end of a spring 23 engages, said spring being seated in a recess 24 in said overhanging portion of the base and tending to force the dog or ratchet 19 into engagement with the corrugations or ratchet teeth 18 on the wheel 16 to lock the wheel against rotation in one direction, and in view of the spring to allow it to rotate freely, step by step, in the other direction. A plate 25 is secured to the end of the supporting base 1 and engaging the wheel 16 where it emerges from the depression 5. This plate 25 forms a means for removing the surplus grease from the wheel.

A bearing 26 is formed in the cylindrical receptacle 6 and the shaft 27 is journaled therein, said shaft 27 having secured thereon the large wheel 28 preferably with a smooth periphery, as shown. This wheel is of hollow formation and has one side cut away to form the flange 29. On the edge of this flange 29 is formed a series of ratchet teeth with which engages a pawl or dog 30, which is pivotally mounted on a boss 31, extending from the cylindrical member 6. This boss or dog constitutes a means for preventing the rotation of the large wheel 28 in one direction. The wheel 28 enters the depression 4 in the base 1 as shown, this depression being formed in a laterally extending portion 32 of the supporting base. On one end of this laterally extending portion is provided a plate 33 which is in approximate contact with the wheel 28 and forms a wiper therefor to remove the surplus grease, while on the other end of said portion is secured the plate or member 34 which is provided with a curved extension 35 having side plates or flanges 36 which embrace the wheel and thus provide a means for returning any grease which may run down the wheel to the depression 4 of the supporting base. A front cap or plate 37 is also provided which is adjustably secured by means of screws 38 and slots 39 to the top of said laterally extending portion 32. This cap or plate has a curved upper edge which bears against the outer surface of the large wheel to prevent the overflow and escape of the grease. An angle plate 40 is provided between the cylindrical member or receptacle 6 and the inner surface of the wheel and engages the inner surface of the wheel to prevent the overflow of the material at that side.

On the other end of shaft 27 is secured beveled gear 41, which meshes with and drives beveled gear 42 secured on the vertically extending shaft 43 which is journaled in the cap 7 of the receptacle at one end and the supporting base at the other end. On this shaft 43 are provided a plurality of inclined leaves or flights 44 arranged in the form of a spiral for the purpose of feeding and forcing the grease which is contained in the receptacle down into and through the outlets and passages 8 and 9 into contact with the outer surfaces of the two applying and distributing wheels.

The operation of the machine is plainly evident from consideration of the above description in connection with the illustrative disclosure and is as follows: The receptacle 6 is filled with a suitably medicated grease for disinfecting, antiseptic and medicinal purposes. The animal, by a rubbing action, on the edge of the wheel 28 will turn the same in one direction, operating the vertical shaft 43 by means of the gear connection as shown and feeding and forcing the grease down into and through the outlets owing to the rotation and action of the flights or leaves. The grease is forced into the depressions in which the wheels operate so that upon the rotation of said wheels, it is taken up on the edge thereof and applied to the back or that part of the body with which the animal is rubbing, thoroughly applying the grease thereto and distributing it. The wipers remove any surplus material to prevent the waste thereof. The restricted openings through the outlets or passages are controlled by means of adjustable valves which may be regulated as desired to control the amount of grease which may be forced therethrough.

It is seen that I have provided a large wheel which is designed, particularly, for use by larger animals, such as the full grown hogs, etc., which larger wheel rotates on a horizontal axis and extends vertically to the ground. I have also provided a smaller wheel which is designed to apply the grease to the under parts of the body and head of the larger animals and also to the smaller animals. This wheel is positioned somewhat lower than the larger wheel and on a horizontal axis at right angles to the horizontal axis of the big wheel. Both wheels are designed to be actuated by either an up and down movement, that is vertically, or by a back and forth movement, that is horizontally. The grease is positively fed by means of the force feed arrangement in a cylindrical receptacle which is actuated by the operation of the larger wheel.

What I claim is:—

1. A rubbing device, comprising a receptacle having an outlet, a force feed therein and a rubber wheel located adjacent said outlet and mounted on a horizontal axis and connected with said feed to operate the same, said wheel adapted to be actuated by animals rubbing thereagainst.

2. A rubbing device, comprising a receptacle having discharge outlets, a force feed therein, a plurality of rubbing wheels located adjacent said outlets and adapted to be actuated by animals rubbing thereagainst, each arranged on a horizontal axis and one of said wheels operatively connected to said force feed.

3. A rubbing device, comprising a receptacle, a force feed therein, a plurality of rubbing wheels adapted to be actuated by animals rubbing thereagainst, said receptacle having outlets to said wheels, said wheels arranged on horizontal axes and one of said wheels having a driving connection with said force feed to operate the same.

4. A rubbing device, comprising a receptacle, a force feed therein, a plurality of rubbing wheels, said receptacle having outlets to said wheels, adjustable valves controlling said outlets, said wheels arranged on horizontal axes and adapted to be actuated by animals rubbing thereagainst and one of said wheels having a driving connection with said force feed to operate the same when said wheel is rotated.

5. A rubbing device for animals, comprising a base member formed with grease-receiving depressions therein and a grease receptacle thereon, said base member having valved passages connecting said depressions and said receptacle, and rubbing members movable in said depressions to take up grease and adapted to be actuated by animals rubbing thereagainst.

6. A rubbing device for animals, comprising a base member, formed with grease-receiving depressions therein and a grease receptacle thereon, said base member having passages connecting said depressions and said receptacle, rubbing members movable in said depressions to take up grease and adapted to be actuated by animals rubbing thereagainst, and means for feeding the grease from the receptacle to the grease receiving depressions.

7. A rubbing device for animals, comprising a base member formed with grease-receiving depressions therein and a grease receptacle thereon, said base member having passages connecting said depressions and said receptacle, rubbing members movable in said depressions to take up grease and adapted to be actuated by animals rubbing thereagainst, means for feeding the grease from the receptacle to the grease-receiving depressions and means for controlling the feed of grease to said depressions.

8. A rubbing device for animals, comprising a base member formed with grease-receiving depressions therein and a grease receptacle thereon, rubbing members movable in said depressions to take up grease and adapted to be actuated by animals rubbing thereagainst, and means for controlling the passage of grease from the receptacle to the grease receiving depressions.

9. A rubbing device, comprising a base member formed with grease-receiving depressions therein and a grease receptacle thereon having communication with said depressions, rubbing members movable in said depressions to take up grease and a force feed in said receptacle, one of same rubbing members operating said force feed.

10. A rubbing device for animals, comprising a base member formed with front and rear grease receiving depressions and a grease receptacle formed thereon, having communication with said depressions, a large rubbing wheel movable in said front depression and a small rubbing wheel movable in said rear depression to take up grease, said wheels adapted to be rotated by animals rubbing thereagainst.

11. A rubbing device, comprising a container for grease, a force feed therein, a wheel having a smooth periphery and positioned to take up grease fed from said container, and gearing connecting the wheel and the force feed to operate the same, said wheel adapted to be actuated by animals rubbing thereagainst.

12. A rubbing device, comprising a container for grease, a force feed therein, two different sized rubbing wheels, each rotating in a direction transverse to the other, and each positioned to take up grease fed from said container, and gearing between one of said wheels and said force feed.

13. A rubbing device, comprising a container for grease having discharge outlets, a shaft in said container having a plurality of short disconnected flights serving as a force feed, two different sized rubbing wheels located adjacent said outlets, and gearing connecting one of said wheels and said force feed, whereby when said wheel is actuated, said grease will be fed.

14. A device for enabling an animal to apply liquid to its skin including a trough for holding the liquid; and a horizontally mounted roller overhanging a longitudinal side of the trough and projecting into the trough space to enable it, as it is being turned by the animal, to transfer liquid from the trough space to the animal.

15. A device for enabling an animal to apply liquid to its skin including a liquid holding trough, a roller structure for transferring liquid from the trough to the skin of an operating animal, and a reservoir having means for supplying liquid to the trough and of lesser width than the roller and located adjacent to said roller, and arranged to have both sides of said roller extend laterally beyond the reservoir.

16. A device for enabling an animal to apply liquid to its skin including a liquid holding trough, a roller structure for transferring liquid from the trough to the skin of an operating animal and overhanging both longitudinal sides of the trough in combination with a reservoir having means for supplying liquid to the trough, said reservoir being of lesser width than the roller and located adjacent thereto and to have both sides of the roller extend laterally beyond the reservoir.

In testimony whereof I affix my signature, in presence of two witnesses.

CHARLES W. SHERMAN.

Witnesses:
 CHAS. W. LA PORTE,
 E. M. BARNHARDT.

Copies of this patent may be obtained for five cents each, by addressing the "Commissioner of Patents, Washington, D. C."